Figure 1:
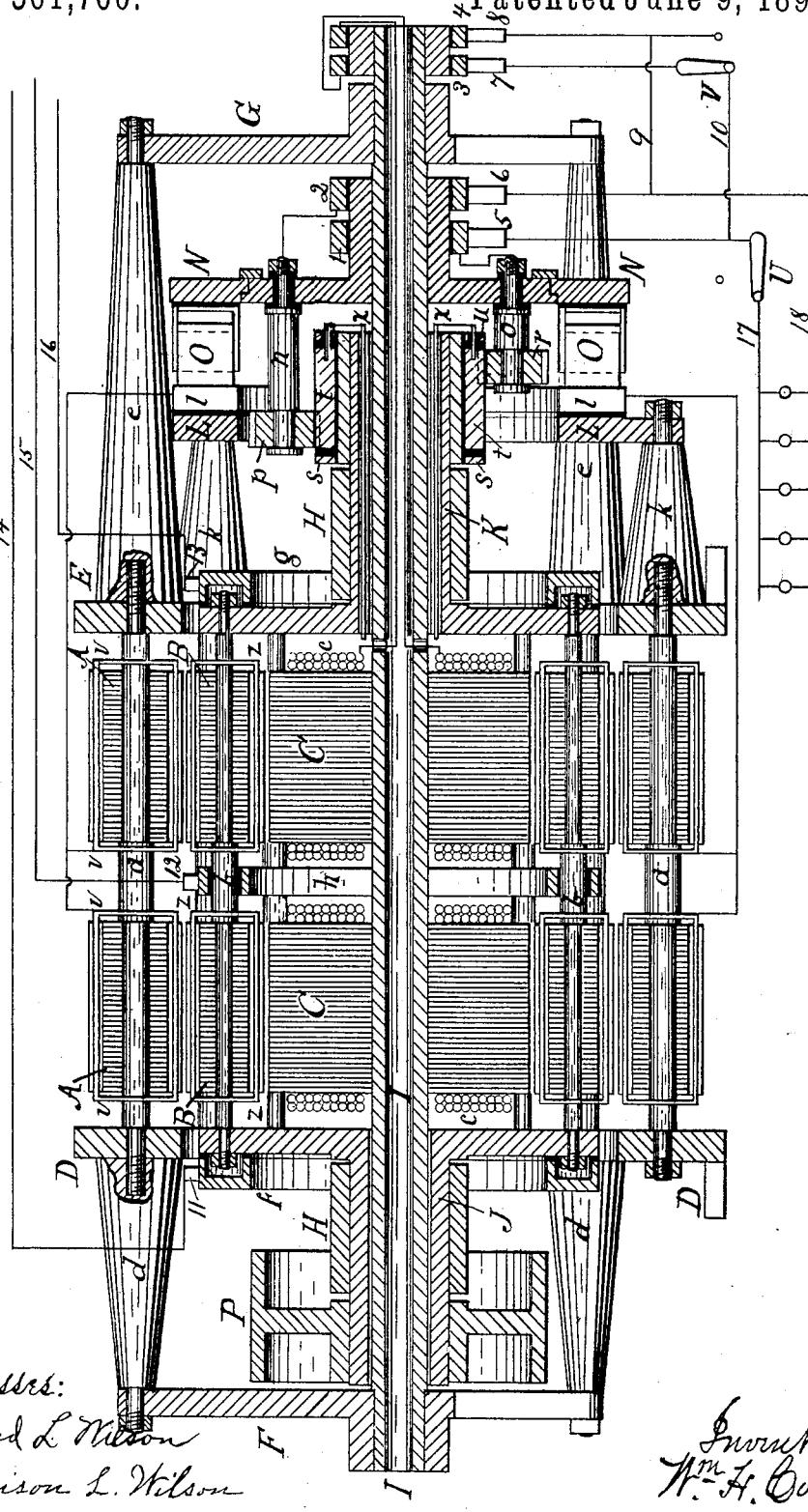

(No Model.)  3 Sheets—Sheet 1.

W. H. COOLEY.
ELECTRIC MOTOR.

No. 561,700.   Patented June 9, 1896.

Witnesses:
Howard L. Wilson
Harrison L. Wilson

Inventor.
Wm. H. Cooley.

(No Model.) 3 Sheets—Sheet 2.

W. H. COOLEY.
ELECTRIC MOTOR.

No. 561,700. Patented June 9, 1896.

Witnesses:
Howard L. Wilson
Harrison L. Wilson

Inventor:
Wm. H. Cooley (No Model.) 3 Sheets—Sheet 3.
W. H. COOLEY.
ELECTRIC MOTOR.

No. 561,700. Patented June 9, 1896.

Witnesses:
Howard L. Wilson
Harrison L. Wilson

Inventor:
Wm H. Cooley

UNITED STATES PATENT OFFICE.

WILLIAM H. COOLEY, OF BROCKPORT, NEW YORK.

ELECTRIC MOTOR.

SPECIFICATION forming part of Letters Patent No. 561,700, dated June 9, 1896.

Application filed March 12, 1895. Serial No. 541,419. (No model.)

*To all whom it may concern:*

Be it known that I, WILLIAM H. COOLEY, a citizen of the United States, residing at Brockport, in the county of Monroe and State of New York, have invented certain new and useful Improvements in Electric Motors, of which the following is a specification.

The object of my invention is the construction of an alternating-current electric motor that shall have a strong tendency toward synchronism and at the same time have an increased starting torque and a more uniform torque at different speeds below synchronism.

While my present invention is applicable to motors intended for use with any multiphase alternating current, I have herein shown and described that modification of it more especially adapted to use with biphase alternating currents.

My invention may consist in two elements bearing the relation to each other of armature and field. Between these elements, by means of alternating currents supplied to the windings mechanically carried by or located and contained on one or both of them, there is established and maintained a relative synchronous rotation, and for this purpose one or both of these elements may be revoluble. By means of such synchronous rotation the alternating currents are rectified by passing through devices carried by each of such elements and coöperating together. These currents, when so rectified, are caused to traverse the windings on a third element, bearing the relation of armature or field to one of such first-named elements, in such a manner as to maintain a constant relation between the poles thus produced in such third element and those produced by such alternating currents in that one of such first-named elements bearing the relation of armature or field thereto. Where both of such first-named elements are revoluble, the third element may be fixed or stationary; but when one of such first-named elements is stationary then the third element will revolve. Two of such three elements should be revoluble.

Hence my invention consists, broadly, in combining with the armature and field of a multiphase-alternating-current machine a third element, and in means for establishing and maintaining between such third element and one of such first-named elements of armature or field a relative synchronous rotation; and it further consists in current-directing devices controlled by such relative synchronous rotation for supplying the alternating currents to windings on such armature in a manner to effect a torque between such elements of armature and field by producing therein poles constant in sign and relative position.

My invention further consists in current-directing devices for supplying to the windings on the armature or armatures of a multiphase-alternating-current motor the multiphase alternating currents supplied to the fields of such motor, constituting means for producing in such armature or armatures magnetic poles constant in sign and maintaining at all times and under all speeds of relative mechanical rotation between such armature and field a constant angular relation to the poles produced in such field by the multiphase alternating currents supplied thereto.

The relative synchronism between such first two elements may consist in the rotation of only one of such elements, or both may rotate in opposite directions at any speed whatever, resulting in such relative synchronous rotation. One of such first-named elements is caused to carry only rectifying and commutating devices or mechanism, coöperating with others on or carried by the other one of such first-named elements, but no other load. Hence the relative synchronous rotation between such first two elements may be almost immediately established on starting the motor and easily maintained. In the case illustrated by the drawings both of the first two elements are revoluble. As in alternating-current machinery in general, I construct my armatures and fields of laminations.

Very obviously, without departing from the spirit of my invention, many modifications may be made therein, adapting it to different styles of construction and to different uses.

Figure 2:
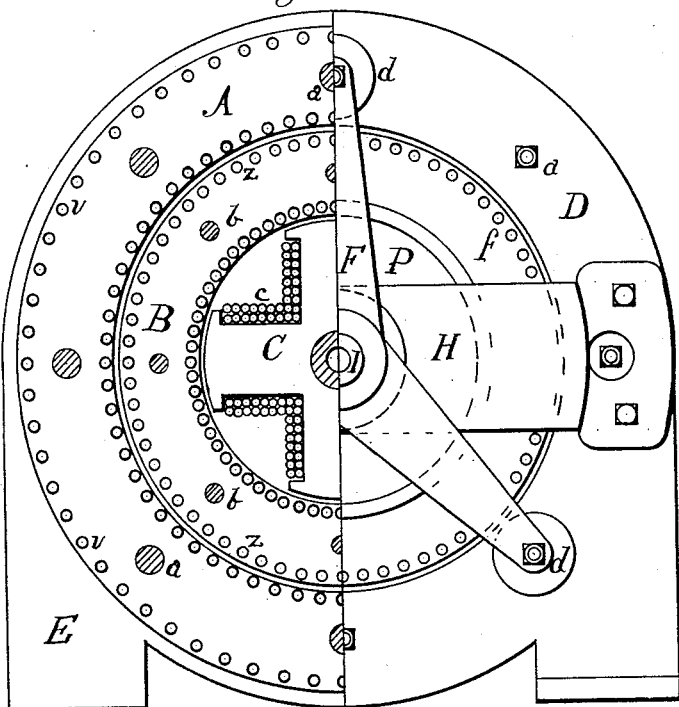
Figure 3:
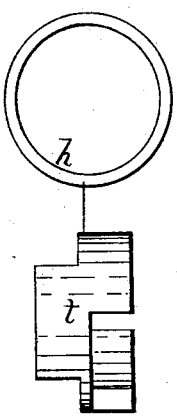
Figure 6:
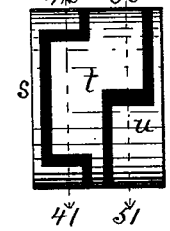
Figure 7:
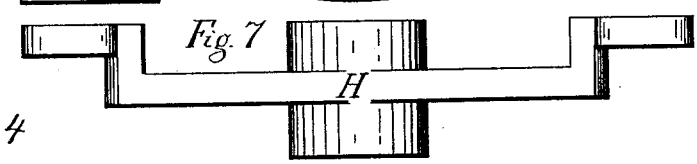
Figure 4:
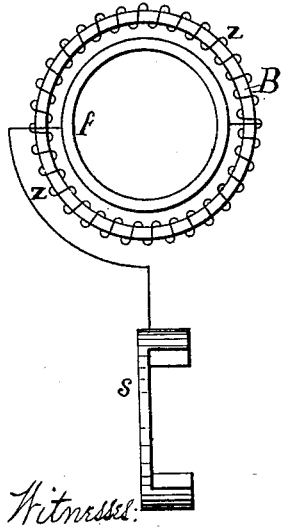
Figure 5:
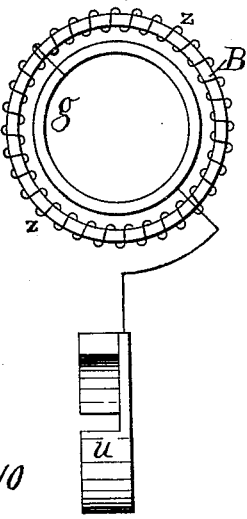
Figure 8:
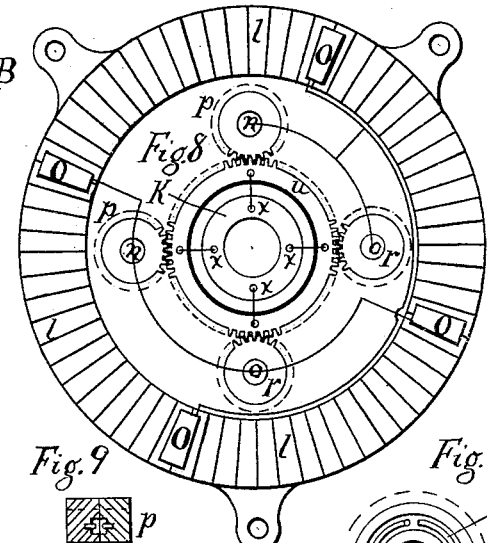
Figure 9:
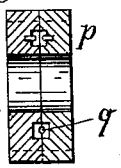
Figure 10:
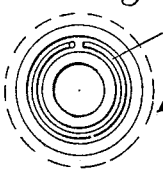
Figure 11:
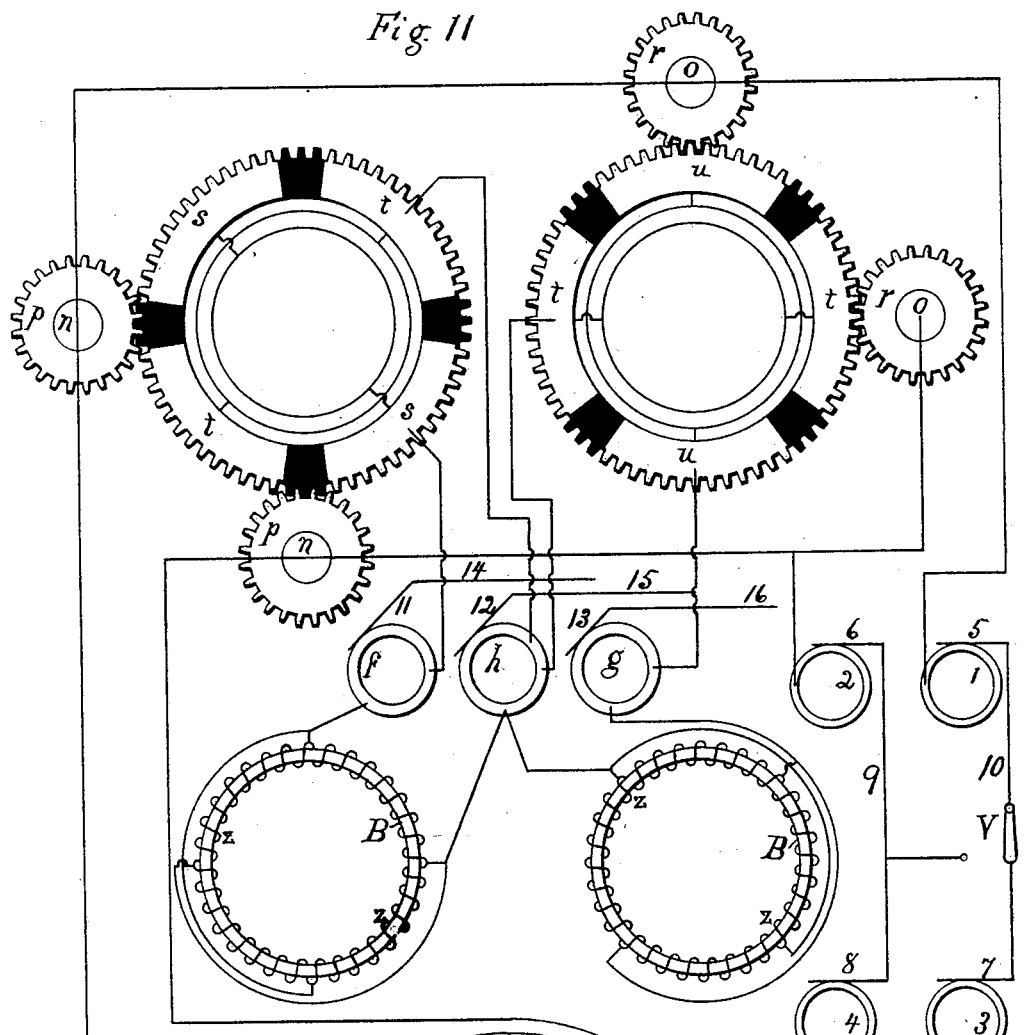
Figure 12:
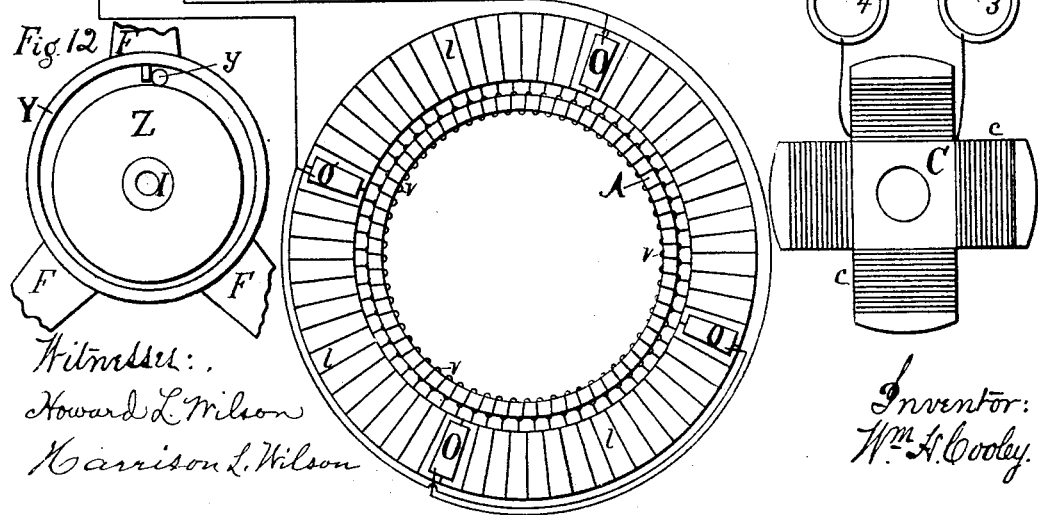

The accompanying drawings, illustrating my invention, are as follows: Figure 1 is a vertical longitudinal section through the center of the machine. Fig. 2 shows to the right of the central vertical line an end view and to the left of such line a vertical transverse section taken through the center of one of the equal fields and armatures—say along line 30 31 of Fig. 1. Fig. 3 shows the central portion $t$ of the rectifying-commutator and its connection with the collector-ring $h$. Fig. 4 shows one of the end or outside portions $s$ of the rectifying-commutator and its connection with the collector-ring $f$, and also the connection between such ring and the windings $z$ on the field B, while Fig. 5 shows the other outside or end portion $u$ of the rectifying-commutator and its connection with the collector-ring $g$, and also the connection between such collector-ring and the windings $z$ on the other field B. Fig. 6 shows in a side view such rectifying-commutator assembled, but before having the teeth or cogs milled out on it. Fig. 7 shows in plan view one of the bearing-plates H. Fig. 8 shows in end view commutator L, and also in diagram the connections made between the brushes O, bearing on commutator L, and the rectifying device carried by interior shaft I. Fig. 9 shows in vertical section one of the small rectifying-gear, as will be explained, while Fig. 10 shows in interior side view one of the equal halves of one of such gear. Fig. 11 shows in diagram all the connections made throughout the entire machine, with all the rectifying and commutating parts therein shown represented as being carried one-fourth of a revolution over to the left from the position in which they are shown in Fig. 8. Fig. 12 shows devices for preventing the motor from racing by means of a clutch acting on a pulley carried by the shaft I, as will be explained.

Similar letters and figures refer to similar parts throughout the several views.

Referring to Figs. 1 and 2, the exterior annular armatures A are supported by rods or bolts $a$ between the circular end plates D and E, having feet formed thereon for the support of the machine, as shown.

Armatures A are each ring-wound with insulated wire $v$ and in closed coils, connected in parallel at regular intervals to the segments $l$ of the commutator L, supported by studs $k$, projecting from end plate E.

End plates D and E have each secured thereto a cross-bar H, forming bearings for the sleeves J and K. Between disk-like formations on the inner ends of each of these sleeves J and K are secured and supported the annular fields B by means of the bolts $b$. The disk J carries the collector-ring $f$, but insulated therefrom, while sleeve and disk K carry the collector-ring $g$, insulated therefrom.

The rods $b$ carry the insulated collector-ring $h$. The fields B are ring-wound in closed coils, the left-hand one being connected at two opposite points to the ring $f$ and at two other opposite points, equidistant between the first two, with ring $h$. Exactly similar connections are made between the windings on the right-hand field B and rings $g$ and $h$, except that, as indicated in Fig. 11, the connections made with the windings of one field are in quadrature with the connections made with the windings on the other field.

The pulley P is carried by the sleeve J, while sleeve K has carried therethrough four conductors $x$, and also has secured thereon a rectifying device, consisting, essentially, in three insulated portions $s$, $t$, and $u$, as indicated in Figs. 3, 4, 5, and 6, carried by a collar on sleeve K, but insulated therefrom. This rectifying-commutator, as indicated in Fig. 6, is substantially of the well-known usual construction, except that, being made for biphase alternating currents, it is double, one portion being in quadrature with the other—that is, with the insulated joints in one part coming between those in the other part. A further departure from the usual construction consists in milling the periphery of such commutator, thus making a spur-gear thereof, as indicated in Figs. 8 and 11.

From the circular plate D are projected studs $d$, supporting the three-armed bearing-plate F, while a similar plate G is supported by the studs $e$ from the circular plate E. These plates F and G have bearings formed thereon for the hollow shaft I, carrying the interior armatures C, each cross-shaped and wound with insulated wire $c$, all connected together and having its terminals carried through the hollow shaft I and connected to the insulated collector-rings 3 and 4, carried on a hub on the right-hand end of the shaft I and having springs 7 and 8, respectively, bearing thereon. This shaft I also carries disk N, upon the hub of which, but insulated therefrom, are located collector-rings 1 and 2, having the springs 5 and 6, respectively, bearing thereon.

The disk N carries four brushes O, located ninety degrees apart and bearing against the sections $l$ of the commutator L, as indicated in diagram in Figs. 8 and 11. This disk N also carries two bolts or studs $n$, insulated therefrom and each carrying a spur-gear $p$, and also two shorter bolts or studs $o$, similarly insulated and each carrying in turn a similar spur-gear $r$. These spur-gear $p$ and $r$ are arranged to mesh with teeth formed on the rectifying-commutator above described, as indicated in diagram in Figs. 8 and 11. Small gear $p$ engage the teeth milled on the projections formed on commutator-segments $s$ and those projections coming between them formed on segment $t$, while the gear $r$ engage the teeth on the projections formed on section $u$ and those coming between them formed on the section $t$ of the rectifying-commutator carried by sleeve K. These gear $p$ are so disposed angularly, it will be readily understood by referring to Figs. 1, 3, 4, 5, 6, 8, and 11, that when the fields B and the armatures C are caused to revolve, whether both of them in opposite directions or only one of them alone, at a speed constituting a relative synchronous rotation between them, causing one-fourth of a revolution for each alternation in the current of either phase, then these gear $p$, coöperating with the rectifying-commutator segments with which they mesh, rectify the alternating current supplied to one of fields B, while the gear $r$ in a similar manner rectify the alternating currents supplied to the other one of such fields B. For this purpose connections are made, such as indicated in Figs. 1, 3, 4, 5, 8, and 11, between rings $f$, $h$, and $g$ and between commutator-sections $t$, $s$, and $u$—that is, the ring $h$ is connected to section $t$, ring $f$ to section $s$, and ring $g$ to section $u$—whereby this rectifying-commutator is placed in derivation with the windings $z$ on fields B, thus rectifying the alternating currents of each phase in this derived circuit only, but not, of course, in the windings $z$ on the fields B.

To prevent rattling and to maintain a more uniform contact between gear $p$ and $r$ and the teeth of the commutator with which they mesh, I construct each of these small gear as indicated in Figs. 9 and 10, which show one of them, for instance $p$. Each of these gear is constructed of two exactly similar halves, channeled out on their sides coming together, so as to receive one convolution of a coil-spring $q$, having its ends bent at right angles to its own plane and entering holes therefor in each section of the gear $p$. The tension on this spring $q$ should be just sufficient to maintain a positive contact, but not to cause an undue wear of the teeth, although the spring will also compensate for considerable wear of the teeth.

For a clearer understanding of the internal connections in the machine reference is made to Fig. 11. The biphase currents enter the machine from the feeders 14, 15, and 16, respectively connected to the springs 11, 12, and 13, bearing also respectively on the collector-rings $f$, $h$, and $g$. These collector-rings being connected with the windings on the fields B, as indicated, supply such biphase currents to such fields. The connections made with one field are in quadrature with those made with the other. Collector-ring $f$ is connected with sections $s$ of the rectifying-commutator, collector-ring $g$ with sections $u$, while collector-ring $h$ is connected with the sections $t$ of the rectifying-commutator.

In the diagram Fig. 11 the rectifying-commutator is shown as in two portions, as if cut by two planes passing through the center of each part—that is, the part used for rectifying each phase is shown as if separated and each portion or part shown in section taken on the lines 40 41 and 50 51 in Fig. 6. The relative speed between the armatures C and the fields B being such that one-fourth of a revolution is made for each alternation of the current of either phase, it will be readily understood that the gear $p$ are caused, each of them, to pass over one section of the rectifying-commutator at each alternation of the current supplied to the machine through the feeders 14 and 15; but as every other section is connected with ring $f$ and the other intermediate ones with the ring $h$, and as the gear $p$ are so disposed angularly that when one of them bears upon a section connected with ring $f$ the other will bear upon a section connected with ring $h$, it will be readily understood that the alternating currents supplied through the feeders 14 and 15 can be taken off through the gear $p$ and the studs or bolts $n$ carrying them as rectified currents. It will also be readily understood that in a similar way the alternating currents supplied through the feeders 15 and 16 may be taken off as rectified currents through the gear $r$ and the studs or bolts $o$ carrying them. These gear $p$ and $r$ are so arranged that the two shown as uppermost in the diagram shall take off current of one sign and the other two shall take off current of the opposite sign.

The uppermost gear $p$ and $r$ are connected together and also with a collector-ring 1, while the other two gear $p$ and $r$ are similarly connected together and with the collector-ring 2. Collectors-rings 4 and 3 form the terminals for the windings $c$ on the armatures C. Springs 6, 5, 8, and 7 bear, respectively, on the collector-rings 2, 1, 4, and 3. Springs 6 and 8 are connected by wire 9, while springs 5 and 7 are connected through switch $v$ by wire 10, when switch $v$ occupies the position shown. Hence rectified currents are supplied to the windings $c$ on the armatures C.

Two opposite ones of brushes O, bearing on the commutator-sections $l$, are connected together and to the uppermost gear $p$ and $r$, while the two other brushes O are similarly connected together and to the lower gear $p$ and $r$. Hence the four brushes O are supplied with rectified currents in a manner to produce four poles in the armatures A, the commutator-sections $l$ being connected with the windings $v$ on the armatures A.

The operation is as follows: Biphase alternating currents are supplied to the machine from the mains 14, 15, and 16, respectively, through springs 11, 12, and 13, bearing on the collector-rings $f$, $h$, and $g$, thereby causing armature C to revolve and almost immediately to come to synchronism, the action between the elements B and C at this time being substantially the same as in inductor-motors—i. e., the biphase alternating currents supplied to the fields B cause rotating magnetic poles therein, which, acting by induction in the well-known manner on the element C, cause such element C to revolve and almost immediately come to synchronism. When synchronism has been reached, these alternating currents are then rectified, only in a branch circuit supplied to each part of the rectifying-commutator in derivation with the windings on a corresponding field B in the manner already described by means of the connections indicated in diagram in Figs. 8 and 11, and are supplied to the brushes O in such a way as to make any two adjacent ones of opposite signs and opposite ones of the same sign, thus supplying rectified currents through the commutator L to the windings $v$ on armature A. These brushes O, carried by element C, revolving synchronously with the rotating magnetic poles set up in element B by the biphase alternating currents supplied thereto, produce four poles in each of the armatures A, rotating and maintaining a constant relation to the poles produced in the fields B by the alternating currents supplied thereto.

It will of course be understood that the alternating currents supplied to the machine are supplied directly and as alternating currents to the windings on the field B and also, in derivation therewith, to the rectifying-commutator sections, from which they are taken off by the gear $p$ and $r$, in the manner described, as rectified currents. Disk N having its outer ring-like portion adjustable on its inner portion, as indicated in Fig. 1, these brushes are thereby capable of angular adjustment upon shaft I, so as to maintain any desired polar relation between armature A and field B.

It will be seen at once that the armatures A being supplied with rectified currents in derivation with the windings $z$ on the fields B (to which alternating currents only are supplied, as above described) before the fields B start up, these fields B are caused to revolve at the start with full torque. As this revolution of fields B increases in speed, owing to the relative synchronous rotation between the fields B and armatures C, which having once been established, in the manner above described, is rigidly maintained within the limits of normal load, (and the element C carries no load whatever,) it causes the armature C to slow down and come to a full stop when the field B has reached synchronous speed. It will of course be readily understood that this relative synchronous rotation between the elements B and C is maintained for any all speeds of rotation of each of them in opposite directions when the sum of their rotation in opposite directions constitutes synchronous speed. Hence either one may remain still and the other revolve, or each may revolve with any speed whatever, provided the sum total of their speeds in opposite directions constitutes synchronous speed. Hence it will be readily understood that as the element B increases in speed the element C must slow down correspondingly; but, whatever the speed of field B, it is caused to run with full torque, because there is supplied at all times to the windings $v$ on armature A a rectified current, producing poles in the armature A, maintaining at all times a constant relation to those produced in the field B.

On starting up the motor, switch V is moved to the right, referring to Fig. 1, or over at the left in a horizontal position, referring to Fig. 11; but it may be moved to the left again, as shown in Fig. 1, or to the right again, as shown in Fig. 11, when the armature C has reached synchronism. When moved to the right, in Fig. 1, or over to the left in a horizontal position, in Fig. 11, it causes the winding $c$ on the armature C to be closed upon itself. A bolt $n$ and a bolt $o$ are connected to the collector-ring 2, while the opposite bolts $n$ and $o$ are connected to collector-ring 1. Hence from springs 5 and 6 there may be taken off rectified currents in derivation with those supplied to the windings $v$ on the armature A. Such rectified currents supplied to the windings $c$ on the armature C, when it has reached synchronism, tend to rigidly maintain such relative synchronism between armature C and field B.

To avoid any tendency of the motor to race under a light load or no load at all, (by carrying the element C backward at such a rate of speed, below that of the element B, as shall constitute a relative synchronous rotation between them,) I make use of the devices illustrated in Fig. 12, to which reference is now made. Upon either end of the shaft I, preferably upon the end carrying the pulley P, I secure a plain pulley Z, and eccentric therewith there is secured upon the outer face of the three-armed bearing-plate F a plain iron rim Y. In the annular space between the pulley Z and the rim Y there is located the roller $y$, of such a diameter as to freely rotate by friction against the pulley Z. This roller $y$ is prevented from being carried by the pulley Z over to the left by means of a downward-projecting stop on the inside of the rim Y; but when the roller $y$ is placed upon the other side—i. e., upon the left-hand side—of this stop then it will be prevented from going over to the right. It will be readily understood that this roller $y$ by being located upon either side, as just described, of this downward-projecting stop operates to prevent a rotation of the pulley Z and the shaft I, to which it is secured, in only one direction at a time, while freely admitting of rotation in the opposite direction, its action being the same as the well-known friction-clutch. For instance, when the roller $y$ occupies the position shown in the drawings, as the pulley Z rotates over toward the right, it carries the roller $y$ with it until such roller $y$ acts as a wedge between the rim Y and the pulley Z, thus preventing further rotation in that direction of the pulley Z, while freely admitting of its rotation in the opposite direction. Of course when rotating over to the left it will cause the roller $y$ to occupy the position shown in the drawings.

What I claim is—

1. Two magnetically separate and distinct series of field-magnets, mechanically united, and each energized by alternating currents of different phase, two magnetically separate and distinct armatures located in operative relation to such magnets, mechanically united, and wound with insulated wire, and means for supplying to the windings on each of such armatures rectified currents from both of such alternating currents of different phase.

2. Two magnetically separate and distinct series of field-magnets, mechanically united, and each energized by alternating currents of different phase, two magnetically separate and distinct armatures, located in operative relation to such magnets, mechanically united, and wound with insulated wire, and means for supplying to the windings on each of such armatures rectified currents from both of such alternating currents of different phase, and for maintaining between the poles produced thereby and those produced in such fields by such alternating currents a constant angular relation.

3. Two magnetically separate and distinct series of field-magnets, mechanically united, and each energized by alternating currents of different phase, two magnetically separate and distinct armatures, located in operative relation to such magnets, mechanically united, and wound with insulated wire, means for supplying to the windings on each of such armatures rectified currents from both of such alternating currents of different phase, means for rectifying such alternating currents consisting in devices carried by such field-magnets and still another (armature or other armatures) located in operative relation thereto, and means for establishing and maintaining between such field-magnets and such last-named armature or armatures, located in operative relation thereto, a relative synchronous rotation.

4. Two magnetically separate and distinct series of field-magnets, mechanically united, and each energized by alternating currents of different phase, two magnetically separate and distinct armatures, located in operative relation to such magnets, mechanically united, and wound with insulated wire, means for supplying to the windings on each of such armatures rectified currents from both of such alternating currents of different phase, means for rectifying such alternating currents consisting in devices, carried by such field-magnets and a third element, coöperating together, and means for establishing and maintaining between such field-magnets and such third element, a relative synchronous rotation.

5. In combination with one element consisting in two or more series of magnets, each series energized by alternating currents of different phase, a second element and means for establishing and maintaining a relative synchronous rotation between such first and second elements, rectifying devices carried by such elements coöperating together, brushes carried by such second element supplying direct currents, from such rectifying devices, to the windings on a third element through the sections of a commutator, connected thereto and upon which such brushes are arranged to bear.

6. In combination with one element consisting in two or more series of magnets, each series energized by alternating currents of different phase, rectifying devices for each of such alternating currents of different phase, carried in part by such element and by a second element coöperating together, means for establishing and maintaining a relative synchronous rotation between such first and second elements, and means for supplying such alternating currents to such rectifying devices, brushes carried by such second element and supplying direct currents from such rectifying devices to the windings on a third element, located in operative relation to such first-named element, through the sections of a commutator connected therewith and upon which such brushes are arranged to bear.

7. In combination with one element consisting in two or more series of magnets, each series energized by alternating currents of different phase, another element located in operative relation thereto, rectifying devices carried in part by such first-named element and by a third element coöperating therewith, means for establishing and maintaining a relative synchronous rotation between such first-named element and such third element, means for supplying direct currents from such rectifying devices to the windings on the second element, and for producing therein poles bearing a constant angular relation to those rotatively set up in such first-named element, for all rates of relative rotation between such first and second elements.

8. In combination with the armature of a multiphase-alternating-current machine, rectifying devices for each alternating current of different phase, coöperating together and carried by mechanism controlled in its operation by such alternating currents of different phase supplied to such machine, and forming an organized part of such machine, means for supplying such alternating currents of different phase to such rectifying devices, means for supplying to the armature or armatures of such machine such alternating currents of different phase rectified by such rectifying devices located in series with such armature or armatures.

9. In an electric machine, commutating devices consisting in a commutator having teeth or cogs formed on the segments thereon, in combination with other gear engaging the teeth on such commutator, such other gear divided on their plane of rotation, and means for producing an angular displacement between the parts thereof.

10. In an alternating-current machine, an element consisting in a field having rotatively-progressing magnetic poles produced therein, an armature located in operative relation thereto and wound with insulated wire, rectifying devices carried by such first-named element and coöperating with others carried by a third element, means for maintaining a relative synchronous rotation between such first and such third named elements, and means for supplying such alternating currents to such rectifying devices and for supplying such alternating currents, rectified thereby, to the windings on such armature and thereby producing therein magnetic poles bearing a fixed angular relation to such rotatively-progressing magnetic poles, for any and all rates of relative rotation between such armature and field.

11. In an alternating-current machine, an element consisting in a field having rotatively-progressing magnetic poles, advancing at a synchronous rate, produced therein, an armature located in operative relation thereto and wound with insulated wire, rectifying devices carried by such first-named element and coöperating with others carried by a third element, means for maintaining a relative synchronous rotation between such first and such third named elements, and means for supplying such alternating currents to such rectifying devices and for supplying such alternating currents, rectified thereby, to the windings on such armature and thereby producing therein magnetic poles rotatively progressing in such armature at a rate which shall constitute the difference between the actual relative rotation between such armature and field and a synchronous rate of relative rotation between such armature and field.

12. In combination with the armature and field of an electric machine and means for producing in one of such elements rotatively-progressing magnetic poles advancing at a synchronous rate, current-directing devices constituting means for supplying alternating currents to the windings on the other one of such elements and thereby producing therein magnetic poles that, for any and all rates of relative mechanical rotation between such elements, shall remain constant in sign and shall rotatively progress in such other one of such elements at a rate which shall constitute the difference between the actual relative rotation between such elements and a synchronous rate of relative rotation between such elements.

13. In combination with the armature and field of an electric machine and means for producing in one of such elements rotatively-progressing magnetic poles, current-directing devices, constituting means for supplying alternating currents to the windings on the other one of such elements and thereby producing therein magnetic poles that shall, for any and all rates of relative rotation between such elements, remain constant in sign and bear a fixed angular relation to such rotatively-progressing magnetic poles.

WM. H. COOLEY.

Witnesses:
HOWARD L. WILSON,
HARRISON L. WILSON.